(12) United States Patent
Whelan et al.

(10) Patent No.: US 8,751,105 B2
(45) Date of Patent: Jun. 10, 2014

(54) RESTRICTED OPERATION OF VEHICLE DRIVEN BY SECONDARY DRIVER WITH REAR PASSENGERS

(75) Inventors: Rene A. Whelan, Farmington Hills, MI (US); Richard W. Smith, Dearborn, MI (US); Abraham Phillip, Rochester Hills, MI (US); Thomas L. Miller, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 13/343,901

(22) Filed: Jan. 5, 2012

(65) Prior Publication Data

US 2013/0179031 A1    Jul. 11, 2013

(51) Int. Cl.
*B60R 25/00*    (2013.01)

(52) U.S. Cl.
CPC ............ *B60R 25/00* (2013.01); *B60W 2540/28* (2013.01)
USPC .............................. 701/36; 180/268; 180/287

(58) Field of Classification Search
CPC .................................................. B60W 2540/28
USPC .............................. 701/36; 180/269, 287, 268
See application file for complete search history.

(56) References Cited

U.S. PATENT DOCUMENTS

| | | | | |
|---|---|---|---|---|
| 6,198,996 B1 * | 3/2001 | Berstis | ............................ | 701/36 |
| 6,278,358 B1 * | 8/2001 | Spoto et al. | ................. | 340/425.5 |
| 6,362,734 B1 | 3/2002 | McQuade et al. | | |
| 6,501,374 B1 * | 12/2002 | King et al. | ................. | 340/457.1 |
| 6,507,779 B2 * | 1/2003 | Breed et al. | ..................... | 701/45 |
| 6,806,810 B2 * | 10/2004 | Robinson | ................... | 340/457.1 |
| 7,868,750 B2 | 1/2011 | Miller et al. | | |
| 8,421,589 B2 * | 4/2013 | Sultan et al. | .................. | 340/5.27 |
| 8,527,146 B1 * | 9/2013 | Jackson et al. | .................. | 701/36 |
| 2002/0078726 A1 * | 6/2002 | Muller | ............................ | 70/247 |
| 2003/0169163 A1 | 9/2003 | Robinson | | |
| 2005/0200466 A1 | 9/2005 | Amemiya | | |
| 2008/0245598 A1 * | 10/2008 | Gratz et al. | .................... | 180/287 |
| 2009/0195376 A1 * | 8/2009 | Miller et al. | ................ | 340/457.1 |
| 2009/0198413 A1 * | 8/2009 | Miller et al. | ..................... | 701/37 |
| 2009/0312901 A1 * | 12/2009 | Miller et al. | ..................... | 701/36 |
| 2009/0312902 A1 * | 12/2009 | Miller et al. | ..................... | 701/36 |
| 2010/0004818 A1 * | 1/2010 | Phelan | ........................... | 701/35 |
| 2011/0082625 A1 | 4/2011 | Miller et al. | | |
| 2011/0137520 A1 * | 6/2011 | Rector et al. | .................... | 701/36 |

FOREIGN PATENT DOCUMENTS

| | | | |
|---|---|---|---|
| EP | 2080678 A2 | 7/2009 | |
| JP | 2006082691 A | * 3/2006 | |
| JP | 2006143157 A | * 6/2006 | |
| JP | 2010012823 A | * 1/2010 | |
| WO | WO 2009158338 A1 | * 12/2009 | .............. B60R 22/48 |

* cited by examiner

*Primary Examiner* — Behrang Badii
*Assistant Examiner* — David Testardi
(74) *Attorney, Agent, or Firm* — Franklin MacKenzie; MacMillan, Sobanski & Todd, LLC (57) ABSTRACT

Restricted operating modes are provided for a motor vehicle when driven by a secondary driver (such as a less experienced driver). A seat occupancy sensor detects the presence of at least one rear seat passenger. A controller includes a memory storing rules defining a restricted operating mode containing a plurality of limitations to be applied to operation of various vehicle accessories in conjunction with the secondary driver. The controller selectively controls the operation of at least one of the accessories according to one of the rules in response to simultaneously detecting the secondary driver and the presence of at least one rear seat passenger. Use of the rules may also depend on whether the rear seat passenger has an unbuckled seat belt.

14 Claims, 4 Drawing Sheets

| | No Rear Passengers | Rear Passenger(s) Present | Unbuckled Rear Passenger |
|---|---|---|---|
| Primary Driver | Unrestricted | Unrestricted | Unrestricted |
| Secondary Driver | Moderate Limit | Strict Limit | Strictest Limit Or Deactivate |

| | No Rear Passengers | Rear Passenger(s) Present | Unbuckled Rear Passenger |
|---|---|---|---|
| Primary Driver | Unrestricted | Unrestricted | Unrestricted |
| Secondary Driver | Moderate Limit | Strict Limit | Strictest Limit Or Deactivate |

RESTRICTED OPERATION OF VEHICLE DRIVEN BY SECONDARY DRIVER WITH REAR PASSENGERS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to systems and methods for controlling operation of motor vehicles in accordance with classifying a driver as a primary driver and a secondary driver.

With conventional automotive vehicles, one or more keys are often shared between any number of drivers. For example, the parents of a teenager (or young adult) that is old enough to drive may share the keys for the vehicle with the teenager. The vehicle may be equipped with various safety and/or driver notification features and other vehicle accessories that may be enabled/disabled via a user interface based on the driver's needs. However, in some circumstances, the parent (i.e., primary driver) may not wish to have the various safety and notification related features disabled by the teenager (i.e., secondary driver) or may not wish other accessories that could be potentially distracting such as an audio system to function while the vehicle is driven by the teenager. The parent may configure the safety and notification features or the other accessories prior to allowing the teenager to drive the vehicle, however there is no guarantee that the teenager will not reconfigure them while driving the vehicle.

Commonly assigned U.S. Pat. No. 7,868,750 discloses a system and method for controlling the operation of vehicle features between primary and secondary drivers based on separately tagged keys for the primary and secondary drivers. The circumstances under which a secondary driver operates the vehicle may include different scenarios with different impacts on the driving behaviors of the secondary driver. Some vehicle accessories such as an audio system may have less impact when the secondary driver drives alone or just with a front seat passenger, whereas playing music may have a greater impact with a fuller vehicle including rear seat passengers. Moreover, prior art systems have not increased the strength of warnings for secondary drivers when rear seat passengers fail to buckle their seat belts or otherwise engage a safety restraint. Since a single set of operating restrictions may not always reflect a best set of restrictions, it would be desirable to tailor restricted operating modes to some of the actual circumstances in which the secondary driver is driving.

SUMMARY OF THE INVENTION

Statistics have shown that safety problems may be increased for teenage drivers in relation to an increase in teenage passengers in the vehicle, particularly with rear seat passengers. The present invention detects when a secondary driver is driving concurrently with the presence of rear seat passengers and then adopts limitations accordingly, especially if the rear seat passengers are not buckled up.

In one aspect of the invention, a system provides a restricted operating mode of a vehicle, wherein the vehicle includes a driver seat for a driver, rear passenger seats for one or more rear seat passengers, and vehicle accessories for operating in the vehicle. At least one primary key is adapted to be assigned to a primary driver, and at least one secondary key adapted to be assigned to a secondary driver. A key ignition device is positioned on each of the primary key and the secondary key and adapted to generate driver status signals indicative of whether the driver is at least one of the primary driver and the secondary driver. A seat occupancy sensor detects the presence of at least one rear seat passenger. A controller is operably coupled to the key ignition device and the seat occupancy sensor, wherein the controller includes a memory storing rules defining a restricted operating mode containing a plurality of limitations to be applied to operation of the accessories in conjunction with the secondary driver. The controller determines whether the driver of the vehicle is at least one of the primary driver and the secondary driver in response to the driver status signals. The controller selectively controls the operation of at least one of the accessories pursuant to one of the rules in response to simultaneously detecting the secondary driver and the presence of at least one rear seat passenger.

DETAILED DESCRIPTION OF PREFERRED EMBODIMENTS

The embodiments of the present invention as set forth herein generally illustrate and describe a plurality of controllers (or modules), or other such electrically-based components. All references to the various controllers and electrically-based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers may be combined with each other and/or separated in any manner based on the particular type of electrical architecture that is desired or intended to be implemented in the vehicle.

Figure 1:
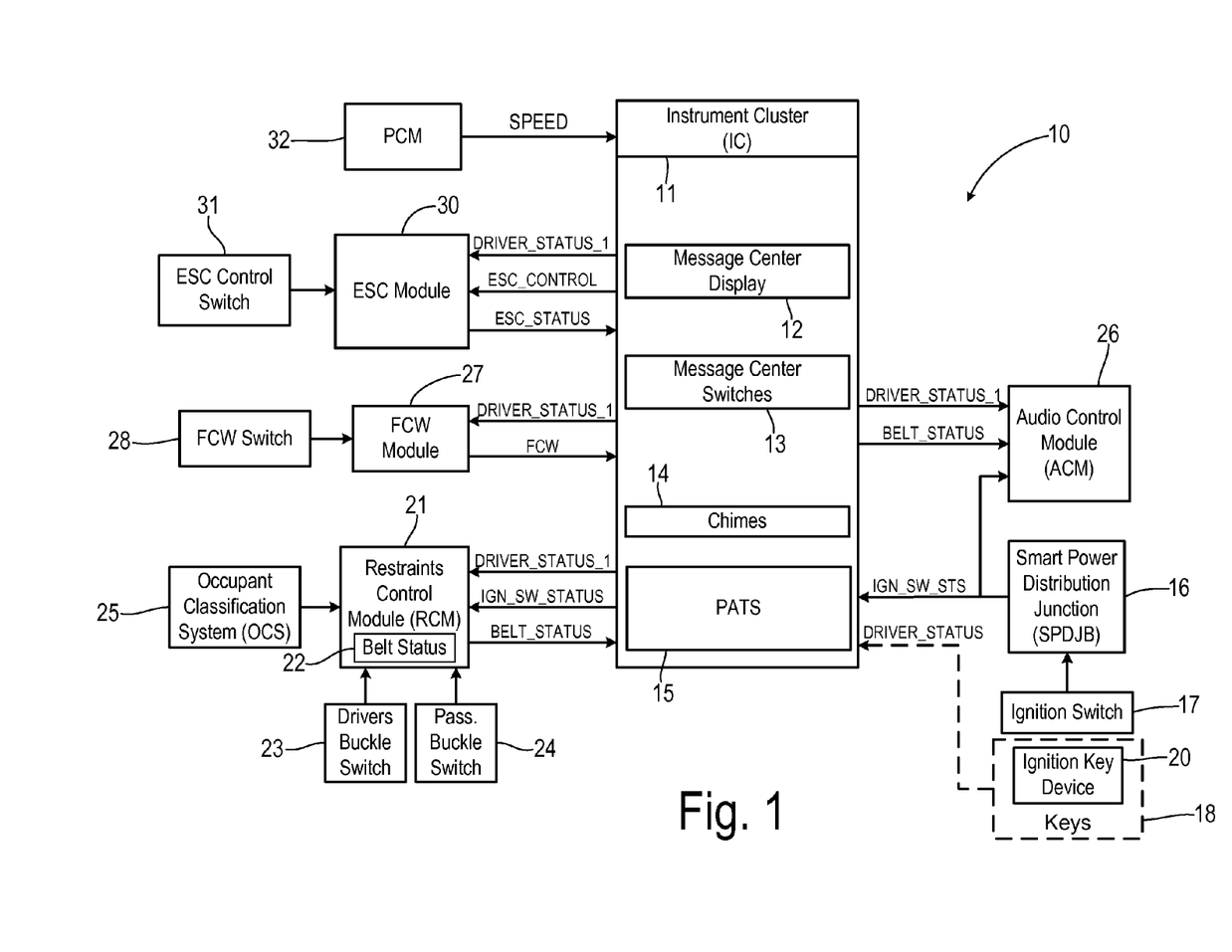
FIG. 1 is a block diagram of a system for differentiating between primary and secondary drivers of a vehicle and for controlling the operation of various vehicle accessories based on the status of the driver in accordance with one embodiment of the present invention.

FIG. 1 depicts a system 10 for differentiating between the primary and secondary drivers of the vehicle and for controlling the operation of various vehicle accessories including safety and notification features based on the status of the driver. The system 10 generally comprises an instrument cluster controller 11. The instrument cluster controller 11 (or cluster) includes a message center display 12 which displays various information such as the various states of vehicle functionality to the driver. For example, the message center display 12 may display and not limited to a driver identification message during vehicle startup, various administrative menu options, a seatbelt warning message, a speed limit start up message, vehicle near top speed message, top speed message, driver identification speed warnings, and/or an inhibit ESC and FCW message.

The cluster 11 also includes a plurality of message center switches 13 and chimes 14. The driver may toggle the message center switches 13 to view different messages and/or respond to various prompts directed to the driver by the vehicle. The chimes 14 may audibly notify the driver when predetermined vehicle conditions have been met. In one example, the cluster 11 may activate the chimes 14 when the vehicle is near a top speed, the vehicle has achieved a top speed, the vehicle has exceeded the top speed, there is a low level of fuel in the fuel tank, and/or when the TC is enabled.

The cluster 11 includes a passive anti-theft security (PATS) controller 15. While FIG. 1 generally illustrates that the PATS controller 15 is positioned within the cluster 11, other implementations may include the PATS controller 15 being implemented as a standalone controller and positioned external to the cluster 11. A smart power distribution junction box (SPDJB) controller 16 may be operably coupled to the cluster 11. The cluster 11 and the SPDJB controller 16 may communicate with each other via a multiplex bus. In general, all of the signals transmitted to/from the cluster 11 may be transmitted via the multiplex bus. The multiplex bus may be implemented as a High/Medium Speed Controller Area Network (CAN) bus or a Local Interconnect Network (LIN). The particular type of multiplex bus used may be varied to meet the desired criteria of a particular implementation. The SPDJB controller 16 may include a plurality of fuses, relays, and various microcontrollers for performing any number of functions related to the operation of interior and/or exterior electrically based functionality of the vehicle. Such functions may include but are not limited to electronic unlocking/locking (via interior door lock/unlock switches), remote keyless entry operation, vehicle lighting (interior and/or exterior), electronic power windows, and/or key ignition status (e.g., Off, Run, Start, Accessory (ACCY)).

An ignition switch 17 may be operably coupled to SPDJB controller 16. The SPDJB controller 16 may receive hardwired signals indicative of the position of the ignition switch 17 and transmit multiplexed messages on the multiplex bus that are indicative of the position of the ignition switch. For example, the SPDJB controller 16 may transmit a signal IGN_SW_STS over the multiplex bus to the cluster 11. The SPDJB controller 16 may transmit the signal IGN_SW_STS to any controller coupled to the multiplex bus that may need key ignition status as an input to perform a particular function.

The ignition switch 17 may receive one or more keys 18 to start the vehicle. The keys 18 may be tagged or associated with the primary driver and the secondary driver of the vehicle. The key 18 includes an ignition key device 20 embedded therein for communicating with the vehicle. The ignition key device 20 comprises a transponder (not shown) having an integrated circuit and an antenna. The transponder is adapted to transmit an electronic code as a signal DRIVER_STATUS to the PATS controller 15. The signal DRIVER_STATUS may be indicative of which driver (e.g., primary or secondary) is driving the vehicle. The signal DRIVER_STATUS may be in the form of radio frequency (RF) based signal or a radio frequency identification (RFID) tag which corresponds to hexadecimal-based data. The PATS controller 15 determines if the hex data in the RFID tag matches predetermined hex data stored therein (e.g., in a look up table of the PATS controller 15) prior to allowing the vehicle to start for anti-theft purposes. In the event the RFID tag matches the predetermined hex data, an engine controller operably coupled to the PATS controller 15 allows the vehicle to start the engine.

In general, the vehicle assembly plant, supplier facility (e.g., manufacturer of the keys and/or PATS controller 15), or car dealership performs the operation of learning the RFID tag of the keys 18 to the vehicle prior to delivery the vehicle to the end user.

The PATS controller 15 may also use the signal DRIVER_STATUS for purposes of identifying whether the driver of the vehicle is the primary driver or the secondary driver. For example, the PATS controller 15 may transmit a signal DRIVER_STATUS_1 to indicate whether the particular driver is the primary driver or the secondary driver to various vehicle controllers or modules as either multiplexed message data or hardwired signals. Prior to the PATS controller 15 transmitting the signal DRIVER_STATUS_1, the primary and secondary keys must be learned by (i.e., programmed into) PATS controller 15.

System 10 may employ different operations for associating the keys 18 to the primary and secondary drivers. In one implementation, the PATS controller 15 may employ a sequential based operation for associating the keys 18 to the primary and secondary drivers. For example, during the learn operation whereby the RFID tag for a particular key is learned to the vehicle to support the passive anti-theft function, the PATS controller 15 may assign priority status to the first key learned which in essence tags the first key as the primary key. The RFID tag of the first key learned to the vehicle may be assigned a higher status than the second key. The RFID tag of the second key when learned to the vehicle may be designated by the PATS controller 15 as the secondary key. The particular order with respect to when a key is assigned primary or secondary status may be varied to meet the designed criteria of a particular implementation. In addition, any number of spare keys may be tagged as being either primary or secondary. For example, any number of replacement or spare keys may be learned to the vehicle and designated as either a primary or a secondary key. After the PATS controller 15 tags the keys 18 as either primary or secondary keys, the PATS controller 15 sends the signal DRIVER_STATUS_1 over the bus to indicate whether the driver of the vehicle is the primary or secondary driver. The tag operation may be performed simultaneously with the process of learning the keys 18 to the PATS controller 15 for passive anti-theft purposes.

In another implementation, the PATS controller 15 may add additional data to the RFID tag to correspond to whether the driver of the vehicle is the primary or the secondary driver. The RFID tag may include a byte which includes predetermined hex values that corresponds to whether the driver of the vehicle is the primary or secondary driver. For example, the byte may include the value "FE" which corresponds to the primary driver. The PATS controller 15 upon receiving the RFID tag with the "FE" value may recognize the particular key as a primary key and determine that the status of the driver is the primary driver. The byte may also include the value "FF" in the place of "FE" which corresponds to the secondary driver. The PATS controller 15 upon receiving the RFID tag with the value "FF" may recognize the particular key as a secondary key and determine that the status of the driver is the secondary driver. It should be noted that the hex bytes "FE" and "FF" are used for illustrative purposes. The particular type of hex data and the length of data used to correspond to the primary and secondary drivers may vary based on the desired criteria of a particular implementation.

A restraint control module (RCM) 21 may be operably coupled to the cluster 11 via the multiplex bus. The RCM 21 may deploy various safety restraint systems in response to the vehicle experiencing impact with an object. For example, the restraint control module 21 may deploy one or more airbags positioned about the vehicle, motorized pretensioners, and/or seat controls to reduce the risk of injury to vehicle occupants in the event the vehicle experiences an impact. A seatbelt status controller 22 may be operably coupled to the restraints control module 21. While FIG. 1 generally illustrates that the seatbelt status controller 22 is positioned within the RCM 21, additional configurations may include positioning the seatbelt status controller 22 out of the RCM 21. The seatbelt status controller 22 is generally adapted to notify the driver that one or more seatbelts in the vehicle have not been fastened or are in an unbuckled state. The seatbelt status operation controller is disclosed in U.S. Pat. No. 6,278,358 to Spoto et al.; U.S. Pat. No. 6,362,734 to McQuade et al.; and U.S. Pat. No. 6,501,374 to King et al. which are assigned to the assignee of the present invention and are hereby incorporated by reference in their entirety.

A driver's buckle switch 23 is coupled to the seatbelt status controller 22 and generally presents data indicative of whether the driver's seatbelt is fastened to the driver. A passenger buckle switch 24 is also coupled to the seatbelt status controller 22 and generally presents data indicative of whether the passenger's seatbelt is fastened. A switch 24 is preferably present for each passenger seat, including rear seats for rear passengers. Thus, belt status may be maintained in seatbelt status controller 22 corresponding to each individual passenger.

An occupant classification system 25 may be optionally coupled to the seatbelt status controller 22 for providing information with respect to the position of the occupants in the vehicle. The seatbelt status controller 22 may use such information provided by the occupant classification system 25 to determine which seat is occupied by an occupant. Based on vehicle occupant location, the seatbelt status controller 22 may have knowledge with respect to which seatbelts may need to be monitored by the seatbelt status controller 22.

In general, the seatbelt status controller 22 is generally adapted to audibly and visually notify the occupant in the vehicle that one or more of the seatbelts are not fastened when the ignition is in the run position and the vehicle speed is above a predetermined speed threshold. In addition, the seatbelt status controller 22 may be deactivated if at any time the seatbelt is fastened (or buckled), or after the seatbelt status controller 22 has audibly and visually notified the occupant for a predetermined amount of time (e.g., five minutes). The seatbelt status controller 22 may include a chime (not shown) for audibly notifying the driver in the event one or more of the seatbelts are not fastened, the vehicle speed has reached and/or exceeded the predetermined vehicle speed threshold, and the position of the ignition switch 17 is in run. The seatbelt status controller 22 may transmit a signal BELT_STATUS over the multiplex bus to the cluster 11 so that the cluster 11 visually notifies the driver via the message center display 12 or with a telltale indicator that one or more of the seatbelts are not fastened (or buckled). The telltale is generally defined as a indicator positioned in the cluster 11 which includes a symbol (e.g., engine, seatbelt, low fuel, etc.) positioned thereon and configured to illuminate when predetermined conditions related to each of the engine, seatbelt and low fuel have been met. The signal BELT_STATUS generally corresponds to a restraint status signal in which one or more of the seatbelts may be unfastened or in an unbuckled state and the vehicle speed and the ignition status conditions have been met. In one example, the seatbelt status controller 22 may transmit an intermittent chime at 240 rep/min at a frequency of 740 Hz. The number or repetitions per minute and the frequency of the chime may vary based on the desired characteristics of a particular implementation. Instead of an integrated chime in controller 22, chimes 14 may be sounded in response to the BELT_STATUS signal.

Cluster 11 transmits the signal IGN_SW_STS to the seatbelt status controller 22 so that the seatbelt status controller 22 may assess the status of the ignition switch 17 (e.g., OFF, RUN, ACCY or START). An audio control module (ACM) 26 may be operably coupled to the cluster 11 via the multiplex bus. The ACM 26 is adapted to generate audible signals for entertainment purposes. The ACM 26 may also be adapted to amplify voice commands in the event a cell phone is coupled to the ACM 26. In addition, the ACM 26 may be used in combination with a voice recognition session. In some embodiments, the ACM 26 ceases to generate audible signals in response to the seatbelt status controller 22 determining that one or more seatbelts are not fastened, and the vehicle speed and ignition status conditions are met. The ACM 26 performs the mute operation in response to receiving the signal BELT_STATUS. The ACM 26 may not be put into a muted state when being used to facilitate a cell phone conversation or when used in connection with a voice recognition session in the event the seatbelts are disabled and the applicable vehicle criteria is met.

Conventional vehicles generally provide drivers with the ability to enable or disable the seatbelt status controller 22 in order to turn off/on the notifications/warnings as desired by the driver. By disabling the controller 22, the controller 22 may cease to audibly notify the driver and cease to transmit the signal BELT_STATUS to the cluster 11 for visually notifying the driver that the seatbelts are in unbuckled state. The system 10 provides the primary driver with the option of selectively enabling/disabling the operation of the controller 22, however, the system 10 may prevent the secondary driver from disabling the operation of the seatbelt status controller 22. The controller 22 receives the signal DRIVER_STATUS_1 to determine whether the driver is the primary driver or the secondary driver. The seatbelt status controller 22 is generally configured "ON" and provides audible notification and the cluster 11 is configured to visually present the safety belt unfastened message when the applicable vehicle criteria is met and in response to determining that the secondary driver is driving the vehicle. The functionality performed by the seatbelt status controller 22 may be incorporated into the cluster 11 or the SPDJB 16.

In one example, the cluster 11 may visually present the option of enabling/disabling the seatbelt status option via the message center display 12 and allow the primary driver to select a corresponding option via the message center switches 13. In such an example, the cluster 11 may transmit a control signal (not shown) to the seatbelt status controller 22 to enable/disable the seatbelt status operation. The cluster 11 on the other hand may not visually present such an option to the secondary driver in response to detecting that the driver of the vehicle is the secondary driver. In the event the driver of the vehicle is the secondary driver, the ACM 26 may be muted in response to determining that the secondary driver is not fastened with a seatbelt and the applicable vehicle criteria is met. The muted characteristic of the ACM 26 may not be enabled/disabled by the secondary driver.

A forward collision warning (FCW) module 27 may be operably coupled to the cluster 11 and receive the signal DRIVER_STATUS_1. The FCW module 27 may be a portion of an active sensing system that is adapted to determine if the vehicle is in a state in which a frontal collision may be imminent. In such a case, the FCW module 27 may transmit a signal FCW to the cluster 11 in the event a forward collision is imminent. The FCW system generally includes a heads up display (HUD) which includes a bank of LEDs. The bank of LEDs are disposed about the windshield of the vehicle. The FCW module 27 may be operably coupled to a radar system (not shown). The radar system detects the position of the object with respect to the vehicle. In the event an imminent collision is detected by the radar system, the radar system transmits a control signal (not shown) to the FCW module 27. The FCW module 27 illuminates the bank of LEDs to notify the occupants that a collision may be imminent. The FCW module 27 generally allows the driver to enable/disable the chime and/or the visual indicators as well as to adjust a particular sensitivity level.

The cluster 11 may also audibly and visually notify (via the message center display 12 (or telltale) and the chimes 14) the driver of the collision when the collision is imminent. An FCW switch 28 may be coupled to the FCW module 27 to enable/disable the FCW module 27 and control vehicle sensitivity. In addition the FCW feature may be enabled/disabled by the primary driver via the message center switches 13 in the cluster 11. In such an example, the cluster 11 may transmit a control signal (not shown) to the FCW module 27 to enable/disable the FCW feature. The primary driver is generally permitted to enable/disable the chime and/or visual indicator and adjust the sensitivity level of the FCW system. The secondary driver is prohibited from disabling the FCW feature in the event the secondary driver is detected to be the driver of the vehicle. For example, the cluster 11 may not present the enable/disable prompt to the secondary driver via the cluster 11 to allow the secondary driver to disable FCW. The cluster 11 is configured to allow the secondary driver to adjust vehicle sensitivity for determining the particular moment in which the FCW warning is to be issued. The secondary driver may increase/decrease sensitivity to trigger the FCW earlier/later based on the selected sensitivity level. The secondary driver is prohibited from enabling/disabling the visual and/or audible warning mechanism of the FCW.

An ESC module 30 may be operably coupled to the cluster 11. The ESC module 30 is adapted to control the operation of various electronic stability control (ESC) systems, such as traction control (TC), yaw stability control (YSC) and rollover stability control (RSC). The ESC module 30 may include a TC controller (not shown), a YSC controller (not shown) and a RSC controller (not shown). The TC controller generally reduces power to drive wheels of the vehicle in order to minimize wheel-spin and maximize traction. The YSC controller generally controls the vehicle's motion of rotation about a vertical axis. The RSC controller generally controls the motion of the vehicle by selectively applying brakes and controlling the speed of the vehicle to prevent the vehicle from rolling over.

An ESC control switch 31 may be operably coupled directly to the ESC module 30 or directly to the cluster 11. The ESC control switch 31 generally allows the driver the ability to enable/disable the one or more ESC operations in the event one or more of the ESC operations are not needed. For example, the ESC control switch 31 may allow the driver the ability to disable the traction control system due to various road conditions, such as snow, dirt, ice, etc. The ESC module 30 is configured to present a signal ESC_STATUS to the cluster 11 so that the cluster 11 can display the current state of ESC systems (e.g., TC, YSC and RSC). In the event the ESC control switch 31 is coupled to the cluster 11, the cluster 11 transmits a signal ESC_CONTROL to the ESC module 30 to enable/disable the ESC operations. The message center switch 13 may also be used by the driver to enable/disable the ESC operation without the need for the ESC switch 31. In such a case, the cluster 11 transmits the signal ESC_CONTROL to the ESC module 30 to enable/disable the ESC operation.

The ESC module 30 is adapted to receive the signal DRIVER_STATUS from the cluster 11 to determine if the driver of the vehicle is the primary or the secondary driver. The ESC module 30 is configured to prevent the secondary driver from disabling any one or more of the ESC operations. For example, the primary driver may desire to prevent the secondary driver from disabling the traction control operation for safety reasons. Such a condition may prevent the secondary driver from spinning or burning the tires and/or drifting when the traction control is disabled. In the event the driver of the vehicle is the secondary driver, the cluster 11 may not present a message in the message center display 12 to the secondary driver to allow the secondary driver to disable the ESC operations. In the event the secondary driver attempts to disable any one or more of the ESC features, the cluster 11 may display an ESC driver status message.

The primary driver may allow the secondary driver to enable/disable the operation of the traction control in the event it may be likely that the secondary driver may experience road conditions that may require disabling traction control. For example, due to various weather conditions or road conditions, the primary driver may configure the ESC module 30 via the cluster 11 to allow the secondary driver to disable the traction control. For example, the message center display 12 may provide for an inhibit traction control message which allows the primary driver the option of either allowing the secondary driver the ability to enable/disable traction control or to inhibit enabling/disabling the traction control.

In the event the primary driver intends to allow the secondary driver to enable/disable the traction control, the primary driver may simply choose not to select the inhibit traction control option with the message center switches 13. No action is required by the primary driver in this case. In the event the primary driver intends to inhibit the traction control disable feature for the secondary driver (e.g., prevent the secondary driver from either enabling/disabling the traction control feature), the primary driver may select the inhibit feature via the message control switches 13 thereby precluding the secondary driver from enabling/disabling the traction control feature. The cluster 11 may transmit the signal ESC_CONTROL to the ESC module 30 (e.g., if the ESC control switch 31 is coupled to the cluster 11) which is indicative of whether the secondary driver can enable/disable the one or more ESC operations or whether the secondary driver is precluded from enabling/disabling the traction feature.

A powertrain control module (PCM) 32 is also coupled to cluster 11 via the multiplex bus. A speed signal SPEED is transmitted to cluster 11 representing the current speed at which the vehicle is traveling. Depending on the magnitude of SPEED, various warnings may be generated to remind a secondary driver to slow down, for example.

Figure 2:
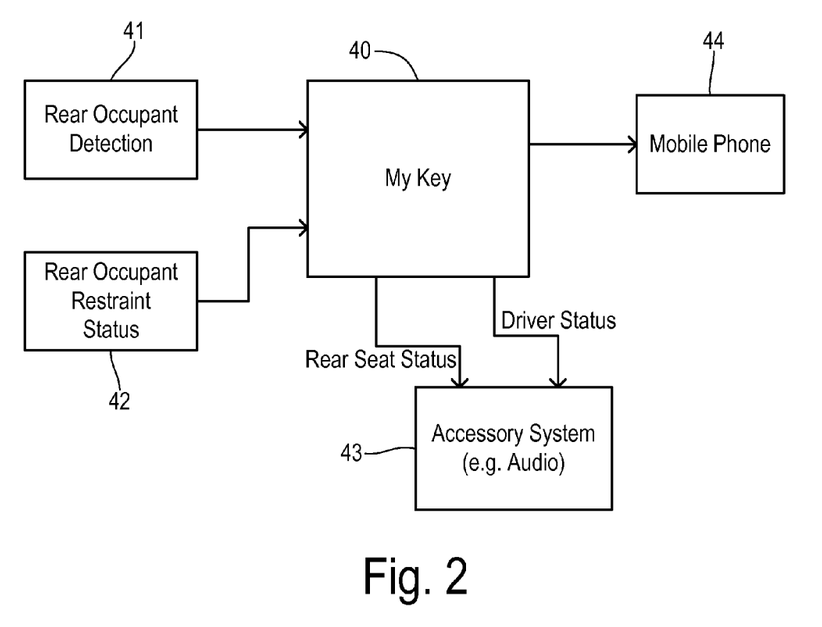
FIG. 2 is a block diagram showing further accessories for providing restricted operating modes for secondary drivers.

FIG. 2 illustrates a first embodiment of the present invention wherein restricted operation of a vehicle when driven by a secondary driver is based on the presence of rear seat occupants. The MyKey system 40 represents a cluster and other elements/modules as shown in FIG. 1. MyKey System 40 is coupled to a rear occupant detection block 41 and a rear occupant restraint status block 42. Rear seat occupant detection may be based on weight sensors, infrared sensors, optical sensors, or audio sensors, for example, in order to ascertain or classify which rear seat positions are occupied by a passenger. A restraint status is determined by block 42 which may be comprised of a seat buckle switch as described above. Restraint status may also be determined according to an engaged or unengaged condition of other types of restraints such as an air bag having selective deactivation (as when a child seat is being used). MyKey system 40 provides a Driver_Status signal (signifying whether the driver is a primary or secondary driver) and a Rear_Seat_Status signal to an accessory system 43, allowing accessory system 43 to implement appropriate rules for operating limitations as described herein. MyKey system 40 is also coupled to a mobile phone 44 which may be used to restrict the secondary driver by initiating the transmission of remote messages (e.g., a text message or a voice phone call) to a pre-configured telephone number of a parent, for example.

Based on detection of the vehicle being driven by a secondary driver, the present invention adopts operating limitations to be imposed according to either 1) just the presence of one or more rear seat occupants, or 2) the presence of rear seat occupants who are not buckled or for whom a passenger restraint is not in an engaged condition (i.e., not set to provide protection during an impact). Particular limitations in the operation of vehicle accessories may include operating accessory system 43 with reduced capability, such as when an audio controller reduces audio volume or completely mutes the output. An operating limitation may also include 1) removing an option that would allow the secondary driver to disable warning messages (e.g., a seat belt reminder message for an unbuckled rear seat passenger) or 2) initiating of the transmission of a message to a parent or primary driver via a mobile phone 44 or other wireless communication device that a) rear seat passengers are present, b) that a rear seat passenger is unbuckled, or c) that the vehicle is traveling at an excessive speed.

The present invention can adopt different restricted operating modes depending on one or more chosen conditions, such as the presence of rear seat passengers, the number of rear seat passengers present, or the presence of rear seat passengers who are unbuckled, for example. As shown in a comparison chart in FIG. 3, a primary driver may operate in an unrestricted mode whether there are rear seat passengers and whether there are unbuckled rear seat passengers. For a secondary driver, however, a restricted operating mode characterized by moderate limits 46 may be imposed when there are no rear seat passengers. When rear seat passengers are present, a strict limit 47 may be adopted. When there is an unbuckled rear seat passenger, the strictest limit or even deactivation of an accessory or the entire vehicle may be imposed on the secondary driver at 48. Of course, the present invention encompasses any combination of conditions for triggering the limitations, provided that there are increased limitations whenever a secondary driver is operating the vehicle with rear seat passengers.

Figure 3:
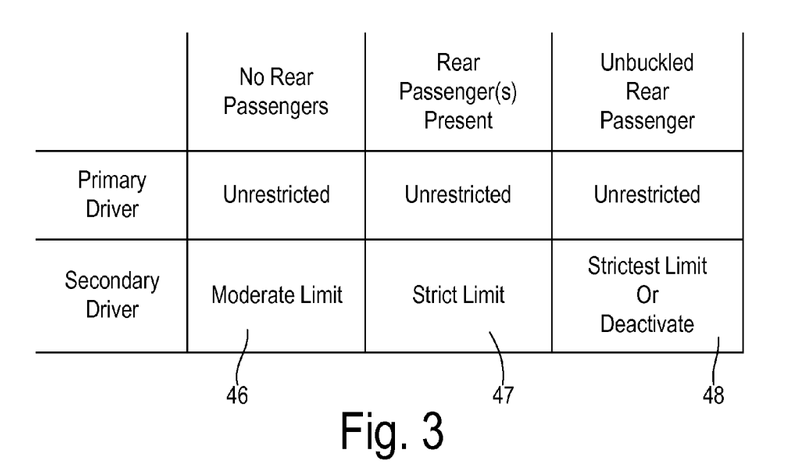
FIG. 3 is a table showing sets of rules for restricted operating modes.

Each of the restricted operating modes in FIG. 3 may be comprised of respective sets of rules for operating the various vehicle accessories. As previously described, the vehicle accessories may include modules that generate various kinds of restraint status warnings. The rules may affect other controllable vehicle accessories such as an audio system that can be muted or have a reduced output gain, a wireless communication module that can be used to send automated messages, or a transmission control that can be inhibited from moving out of the park position to keep the vehicle from being driven. Variation of the operating limits shown in FIG. 3 may be comprised of different collections of rules or differences in actual limitations within a single rule. For example, an upper speed warning may be set at one particular speed for moderate limit 46, at a somewhat lower speed for strict limit 47, and at an even lower speed for strictest limit 48. Moderate limit 46 may permit operation of the audio system, while strict limit 47 sets an upper volume at which the audio system can be played, while strictest limit 48 completely mutes the audio output.

Figure 4:
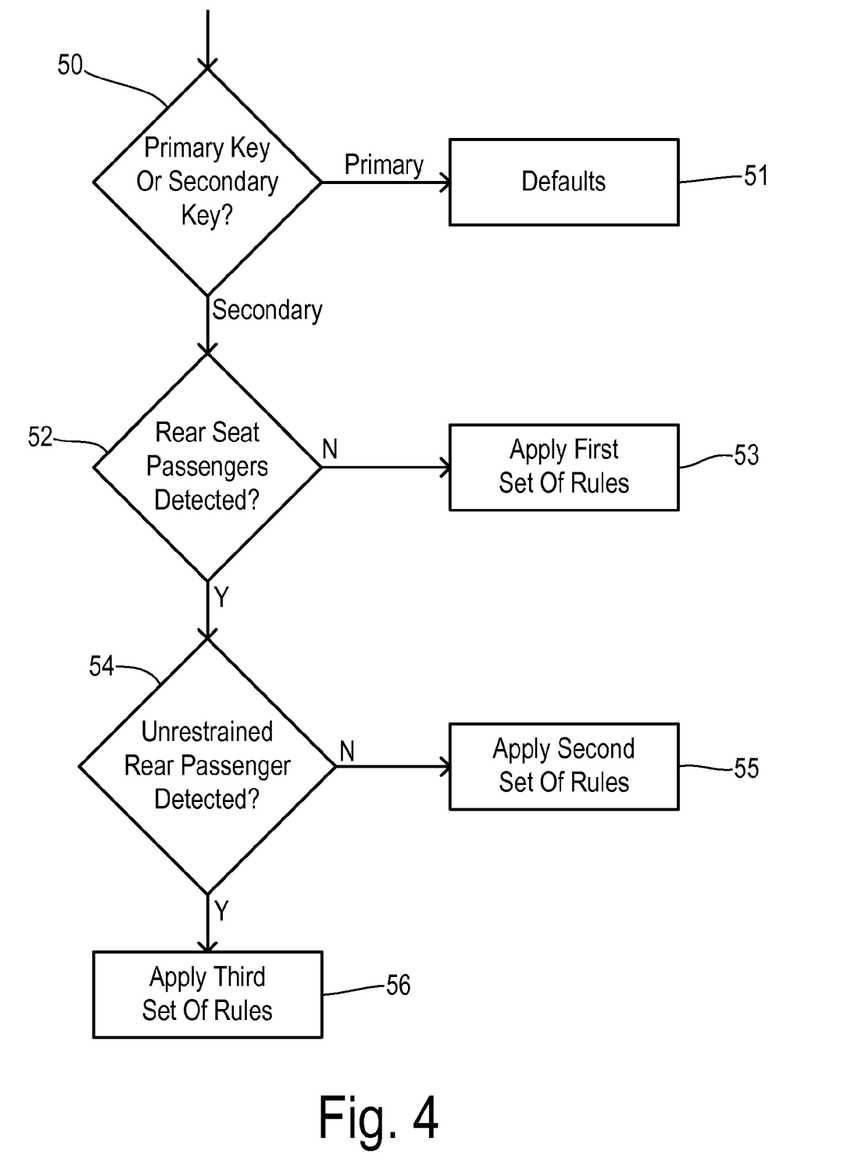
FIG. 4 is a flowchart showing a first embodiment of a method of the invention.

More than one vehicle accessory may be affected in response to the secondary driver having a rear seat passenger. Thus, a set of one or more rules is adopted in response to the underlying conditions, as shown by an example method in FIG. 4. A check is made in step 50 to determine whether a primary key or a secondary key is present. If the primary key is detected, then default rules corresponding to unrestricted operation for various vehicle accessories are set in step 51. If a secondary key is detected, then a check is made in step 52 to determine if any rear seat passengers are present. If not, then a first set of rules is applied in step 53 (e.g., moderate limitations). If rear seat passengers are detected in step 52, then a check is made in step 54 to determine whether any rear seat passengers are unrestrained. If not, then a second set of rules is applied in step 55 (e.g., strict limitations). If there is an unrestrained rear passenger, then a third set of rules may be applied in step 56 (e.g., strictest limitations).

Figure 5:
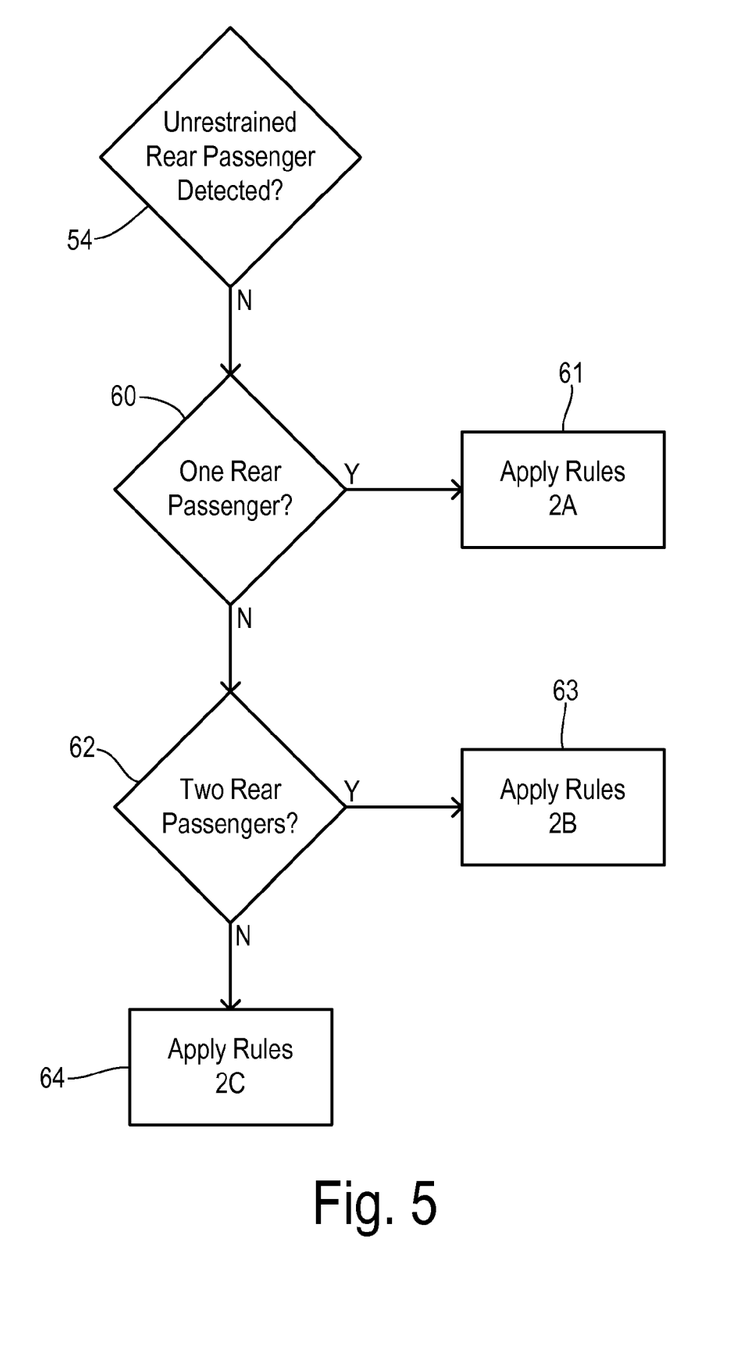
FIG. 5 is a flowchart showing a second embodiment of a method of the invention.

In another embodiment shown in FIG. 5, a particular restricted operating mode can be chosen based on how many rear seat passengers are present. Thus, if step 54 detects that there are no unrestrained rear seat passengers, then a check is made in step 50 to determine whether there is just one rear seat passenger. If so, then a modified set of rules 2A is applied in step 61. A check is made in step 62 to determine whether there are two rear seat passengers. If so, then a set of rules 2B may be applied in step 63. If there are more than two rear seat passengers, then a third set of rules 2C is applied in step 64.

The primary driver has the option of defining various sets of rules and defining how many different sets of rules should be used based on the various circumstances relating to rear seat passengers and the presence of unrestrained passengers. Separate sets of rules may or may not be set up that take into account how many rear seat passengers are present. In any case, the primary driver is able to enforce certain desired limitations on operation of the vehicle by a secondary driver according to perceived risks associated with rear seat passengers.

What is claimed is:

1. A system for providing a restricted operating mode of a vehicle, wherein the vehicle includes a driver seat for a driver, rear passenger seats for one or more rear seat passengers, and vehicle accessories for operating in the vehicle, the system comprising:

at least one primary key adapted to be assigned to a primary driver;

at least one secondary key adapted to be assigned to a secondary driver;

a key ignition device positioned on each of the primary key and the secondary key and adapted to generate driver status signals indicative of whether the driver is at least one of the primary driver and the secondary driver;

a seat occupancy sensor for detecting the presence of at least one rear seat passenger;

a passenger restraint system having an engaged condition for providing crash protection for the at least one rear seat passenger; and a controller operably coupled to the key ignition device and the seat occupancy sensor, wherein the controller includes a memory storing first, second, and third sets of rules defining respective restricted operating modes containing a plurality of limitations to be applied to operation of the accessories in conjunction with the secondary driver, the controller being adapted to:

determine whether the driver of the vehicle is the secondary driver in response to the driver status signals;
determine whether a rear seat passenger is present;
determine whether the rear seat passenger is restrained; and
selectively impose operational limitations to at least one of the accessories to reduce potential distractions when the secondary driver is detected, wherein the controller imposes i) the first set of rules characterized by moderate operational limitations in response to a determination that no rear seat passenger is present, ii) the second set of rules characterized by stricter operational limitations in response to a determination that a rear seat passenger is present and every rear seat passenger is restrained, and iii) the third set of rules characterized by strictest operational limitations or deactivation of an accessory in response to a determination that any rear seat passenger is present and unrestrained.

2. The system of claim 1 wherein the passenger restraint system is adapted to generate a restraint status warning when a rear seat passenger is detected and the passenger restraint system is not in the engaged condition for the rear seat passenger, wherein the controller is capable of allowing the driver to disable the restraint status warning, and wherein one of the rules is comprised of defeating the driver's ability to disable the restraint status warning.

3. The system of claim 2 wherein the passenger restraint system comprises a seat belt and wherein the restraint status warning is comprised of a seat belt reminder.

4. The system of claim 2 wherein the vehicle accessories include a mobile phone, and wherein one of the rules is comprised of sending an automated message that the secondary driver and the presence of at least one rear seat passenger without the passenger restraint system being in the engaged condition for the rear seat passenger are simultaneously detected.

5. The system of claim 1 wherein the vehicle accessories include an audio system, and wherein one of the rules is comprised of inhibiting an output from the audio system.

6. The system of claim 1 wherein the vehicle accessories include a mobile phone, and wherein one of the rules is comprised of sending an automated message that the secondary driver and the presence of at least one rear seat passenger are simultaneously detected.

7. The system of claim 1 wherein the vehicle accessories include a transmission control with a park position, and wherein one of the rules is comprised of inhibiting the transmission control from moving out of the park position.

8. A method of providing a restricted operating mode of a vehicle, wherein the vehicle includes a driver seat for a driver, rear passenger seats for one or more rear seat passengers, a passenger restraint system having an engaged condition for providing crash protection for the rear seat passengers, and vehicle accessories for operating in the vehicle, the method comprising the steps of:
tagging at least one primary key to a primary driver;
tagging at least one secondary key to a secondary driver;
configuring a controller in the vehicle to store first, second, and third sets of rules defining respective restricted operating modes containing a plurality of limitations to be applied to operation of the accessories in conjunction with the secondary driver;
initiating operation of the vehicle using the primary key or the secondary key;
generating driver status signals indicative of whether the driver is the primary driver or the secondary driver;
detecting the presence of at least one rear seat passenger;
determining whether the rear seat passenger is restrained; and
selectively imposing operational limitations to at least one of the accessories to reduce potential distractions when the secondary driver is detected, wherein the operational limitations are comprised of imposing i) the first set of rules characterized by moderate operational limitations in response to a determination that no rear seat passenger is present, ii) the second set of rules characterized by stricter operational limitations in response to a determination that a rear seat passenger is present and every rear seat passenger is restrained, and iii) the third set of rules characterized by strictest operational limitations or deactivation of an accessory in response to a determination that any rear seat passenger is present and unrestrained.

9. The method of claim 8 wherein the passenger restraint system is adapted to generate a restraint status warning when a rear seat passenger is detected and the passenger restraint system is not in the engaged condition for the rear seat passenger, wherein the controller is capable of allowing the driver to disable the restraint status warning, and wherein one of the rules is comprised of defeating the driver's ability to disable the restraint status warning.

10. The method of claim 9 wherein the passenger restraint system comprises a seat belt and wherein the restraint status warning is comprised of a seat belt reminder.

11. The method of claim 9 wherein the vehicle accessories include a mobile phone, and wherein one of the rules is comprised of sending an automated message that the secondary driver and the presence of at least one rear seat passenger without the passenger restraint system being in the engaged condition for the rear seat passenger are simultaneously detected.

12. The method of claim 8 wherein the vehicle accessories include an audio system, and wherein one of the rules is comprised of inhibiting an output from the audio system.

13. The method of claim 8 wherein the vehicle accessories include a mobile phone, and wherein one of the rules is comprised of sending an automated message that the secondary driver and the presence of at least one rear seat passenger are simultaneously detected.

14. The method of claim 8 wherein the vehicle accessories include a transmission control with a park position, and wherein one of the rules is comprised of inhibiting the transmission control from moving out of the park position.

* * * * *